Oct. 28, 1952     F. G. WALKER     2,615,457
DISH HOLD-DOWN FOR DISHWASHING MACHINES
Filed Jan. 13, 1950
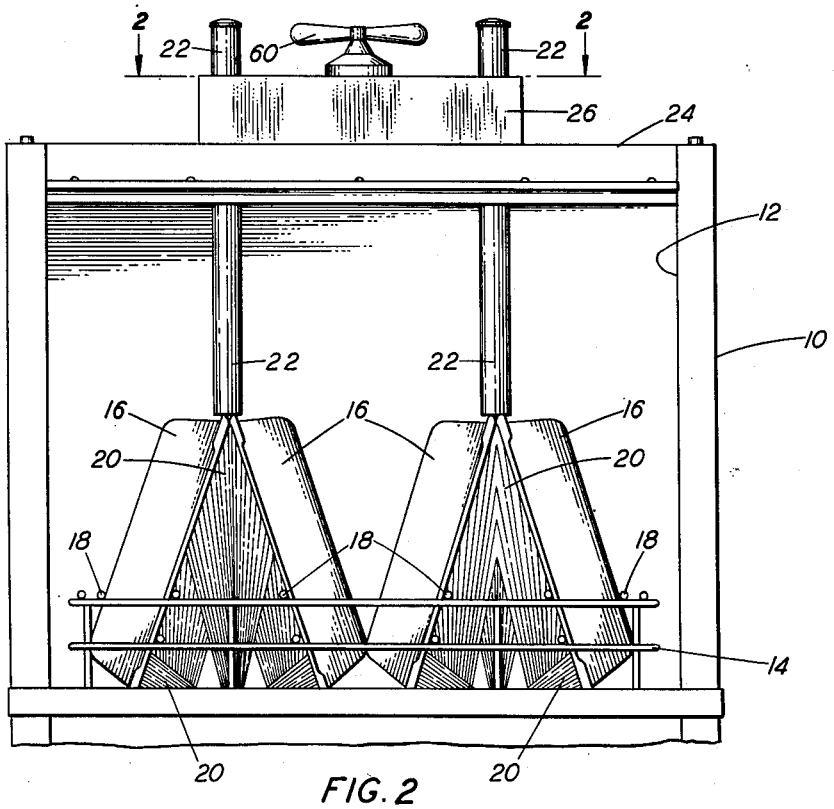
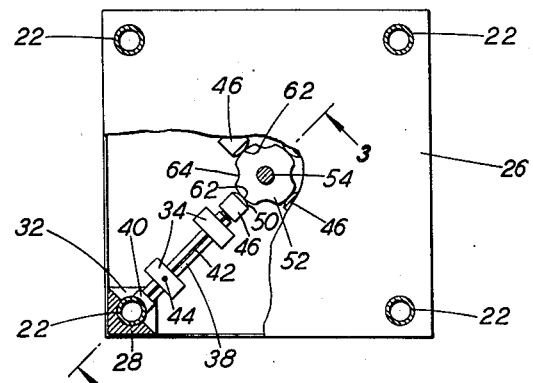
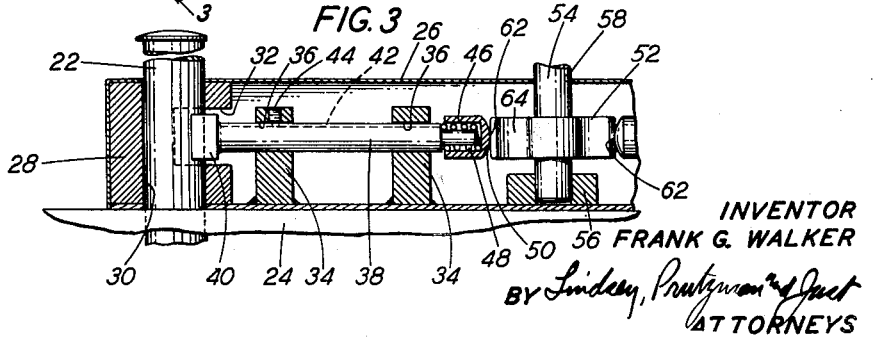
INVENTOR
FRANK G. WALKER
BY Lindsey, Prutzman & Pratt
ATTORNEYS Patented Oct. 28, 1952

2,615,457

UNITED STATES PATENT OFFICE 2,615,457

DISH HOLD-DOWN FOR DISHWASHING MACHINES

Frank G. Walker, Minneapolis, Minn.

Application January 13, 1950, Serial No. 138,343

8 Claims. (Cl. 134—201)

This invention relates to improvements in a holder for a dishwashing machine and more particularly but without restriction thereto, to a holder for a dishwashing machine adapted to wash culinary and cooking utensils such, for example, as steam table, baking and roasting pans.

In using dishwashing machines for washing and cleansing either large dishes or cooking or baking utensils, such as steam table, roasting and baking pans which frequently are of various sizes and shapes, difficulty has been experienced in holding said dishes, utensils and pans in suitable position within a dishwashing machine so that the sprays and jets of water and washing solutions discharged against such items will engage all surfaces of such items and particularly all interior surfaces thereof.

It also frequently occurs that food matter and particularly gravy, sauces and the like, become very firmly adhered to such culinary articles as referred to above, whereby sprays or jets of water or cleansing solutions have to be discharged against such articles at higher pressures than are used normally in conventional dishwashing machines used to wash dishes and the like. It has been found that such high pressure sprays and jets will frequently dislodge or displace these culinary articles from the position in which they were placed within the rack of the dishwashing machine, whereby the culinary articles will not have all surfaces thereof, and particularly all of the interior surfaces thereof, engaged by the washing sprays and jets.

It is an object of the present invention to provide holding means for use with a dishwashing machine preferably adapted to washing culinary articles, such as cooking utensils and steam table, baking and roasting pans, so that said culinary articles will be held against displacement from any desired position in which they are placed within the dishwashing machine when jets of water or cleansing solution are discharged against such articles so as to thoroughly cleanse them.

It is another object of the invention to provide for a dishwashing machine holding means comprising a plurality of holding members which may be positioned independently and variously relative to the dishwashing machine so as to engage stacked culinary articles and maintain them in suitable position to be engaged by the spray jets and streams discharged against them, even though said sprays or jets may be discharged thereagainst at relatively high pressures.

It is still another object of the invention to provide frictional means for individually engaging each of said holding members, whereby said holding members may be individually positioned against articles within the washing machine and be maintained in any adjusted position while the other holding members are being adjusted to their operative positions.

It is a further object of the invention to provide locking means which are simultaneously operable to lock all of said holding means in any desired holding position after the same have been adjustably moved to their individual operative positions.

Details of these objects and of the invention, as well as other objects thereof, are set forth in the following specification and illustrated in the accompanying drawing comprising a part thereof.

In the drawings:

Fig. 1 is a fragmentary side elevation of a dishwashing machine embodying the holding means comprising the present invention, said dishwashing machine being open in this view to illustrate the holding function of the invention.

Fig. 2 is a top plan view taken on line 2—2 of Fig. 1, said view being partially broken away to illustrate details of the invention.

Fig. 3 is a vertical sectional elevation taken on line 3—3 of Fig. 2, said view being on a larger scale than in Fig. 2.

Illustrated in Fig. 1 is a casing 10 of a substantially conventional dishwashing machine, one wall of said casing having an entrance opening 12 through which a rack 14 may be inserted and removed, said rack being of the type used to support dishes and other culinary utensils while being washed within the casing 10. The rack 14 is shown in the present drawing as supporting a plurality of exemplary culinary articles, such as pans 16. The rack 14 may be of the type provided with cross bars 18 arranged so as to position the pans in at least a partially inverted position, whereby sprays or jets 20 directed upward from the lower part of the casing 10 may contact all interior surfaces of the pans 16. The jets 20 are supplied by suitable spray nozzles or arms, not shown, the same being either movable or stationary. It is also to be understood that other spray nozzles may be arranged in the upper portion of the casing 10 so as to direct sprays or jets of water or cleansing solution downward against the dishes or culinary articles such as the pans 16 illustrated in Fig. 1. For purposes of the present description and the appended claims, it is to be understood that the term dishes shall include all of the culinary articles referred to hereinabove.

As mentioned hereinabove, the jets or sprays 20 are frequently discharged at relatively high velocities and pressures, some being of the order of 30 or 35 lbs. per square inch. When sprays of this range of pressure are discharged against pans stacked similarly to pans 16 in Fig. 1, it has been found that said pans not infrequently become dislodged or shifted from the positions in which they were placed within the rack 14 so that the sprays do not engage all of the interior surfaces thereof to cleanse them.

To overcome the possibility of the pans and other culinary articles being dislodged or shifted within the rack 14 when, for example, the sprays 20 are directed against the interior of said pans, the present invention contemplates the use of holding means supported by the casing 10 and comprising a plurality of rods 22 which are slidable vertically relative to the top 24 of the casing. For convenience, the rods 22 may be in the form of cylindrical tubes and the lower ends thereof may be moved downward into engagement with the culinary articles positioned within the rack 14 by the lower ends of the rods 22 engaging the uppermost portions of the pans 16, as illustrated in Fig. 1.

Mounted on the upper surface of the top 24 is a box-like housing 26 which is fixed to the top 24. Positioned within the housing 26, and fixed thereto preferably adjacent each corner thereof, is a bearing block 28 having a vertical bearing opening 30 therein. One of the rods 22 is slidably mounted within each bearing opening 30. Each bearing block 28 is also provided with a transverse opening 32 intersecting the bearing opening 30 for purposes to be described. The top of the housing 26 and the top 24 of the casing 10 are provided with apertures in axial alignment with the bearing openings 30 so as to accommodate the rods 22.

Also supported by the top 24 within the housing 26 are a plurality of pairs of guide blocks 34 having guide bearing openings 36 in the upper portions thereof, each pair of openings being in axial alignment with each other for purposes of slidably receiving a bar 38. Each bar is provided at one end with a removable end 40 having a concave face complementary to the outer surface of the rod 22, said concave face slidably engaging said rod. The bar 38 is preferably cylindrical and has a longitudinal spline 42. One of the guide blocks 34 is provided with a guide screw 44, the inner end of which is slidably disposed within the spline 42 of the bar 38 so as to permit longitudinal movement of the bar but not rotatable movement thereof relative to the guide blocks 34, whereby the concave face at the end 40 of the bar 38 will always be maintained in proper alignment to engage the cylindrical outer surface of the rod 22 in engagement therewith.

The housing 26 contains a plurality of bars 38 mounted within the guide blocks therefor, said bars extending radially outward from the center of the housing 26 and one of said bars being provided for each of the rods 22. This is evident from Fig. 2 wherein one of the bars 38 is shown in its entirety and portions of the other three bars are viewable through the portion of the housing 26 which has been broken away in said figure. Further, while the present drawing illustrates four exemplary rods 22, it is to be understood that any desirable number of such rods may be provided for the casing 10 and said rods are preferably positioned in plan view relative to said casing so that the lower ends of the rods will be in position to engage in the most effective manner the uppermost portions of the dishes or other culinary articles placed within the casing 10 for washing operations.

The end of each of the bars 38 nearest the center of the housing 26 is provided with a spring biased shoe 46. Each of these shoes is cup-shaped as clearly shown in Fig. 3. The end of the bar 38 which supports said shoe is preferably reduced in diameter, as also shown in said figure, and a compression spring 48 surrounds said reduced end of the bar so as to apply pressure against the shoe 46 so as to urge it away from the bar 38. The outer end of each of the shoes is provided with a convex surface 50 which is engageable with a star cam 52 rotatably supported about a vertical axis substantially centrally of the housing 26. The cam is fixed to a vertical shaft 54, the lower end of which is rotatably mounted in a bearing 56 fixed to the top 24 of the casing 10. The shaft 54 projects through a suitable opening 58 formed in the top of the housing 26. Fixed to the outer end of the shaft 54 is a transverse handle 60 by which the star cam 52 may be manually manipulated.

In plan view, the cam 52 is shaped as shown in Fig. 2, said cam having a plurality of evenly spaced projections 62 and when the cam 52 is rotated, disposes the projections, respectively, in engagement with the shoes 46 of the bar 38, thereby moving the ends 40 of said bars into firm clamping engagement with the rods 22 so as to securely hold the lower ends thereof in engagement with the pans 16 within the rack 14. Thus, the bars 38 are positioned in locking engagement with the rods 22 when the cam 52 is in its position illustrated in Fig. 2.

Between each of the projections 62 on the cam 52 is a concave surface 64. When the cam 52 is rotated by means of handle 60 so as to position the concave surfaces 64 in engagement with the shoes 46, the concave surfaces in the ends 40 of the bars 38 will remain in frictional engagement with the rods 22 but said engagement will be such that the rods may be vertically moved within the bearing openings 30 so as to permit individual adjustment or movement of the rods 22 relative to the top 24 of the casing 10. However, when adjusting or moving said rods relative to the top of the casing under these conditions, the friction between the concave surfaces of the ends of the bars 38 and the rods 22 caused by the pressure of the springs 48 will serve to hold the rods 22 in any desired position of adjustment while the other rods are being adjusted and until all of the rods have been adjusted and are positioned ready for locking the same in said adjusted positions upon rotating the star cam 52 so as to bring the projections 62 thereon into engagement with the shoes 46 of the bars 38.

It will be seen from the foregoing that the present invention provides simple, durable, inexpensive, and effective means for holding dishes and culinary articles such as cooking utensils and pans in positions within a rack in a dishwashing machine so that said dishes and utensils will not become dislodged or displaced from an effective washing position when jets or sprays of water or cleansing solution are discharged at relatively high pressure, or otherwise, against said dishes and utensils and particularly against the inner surfaces thereof for purposes of washing and cleansing the same. The holding means are mounted so as to permit individual adjustment of the same and any adjusted position thereof will be maintained by the supporting means until said holding means may be locked in effective operative position during a washing operation. The locking means is also such that a single manual manipulation thereof serves simultaneously to lock all of the individual holding rods in adjusted operative position. Conversely, a single manipulation of the locking means serves to release all of the holding rods from locked position, whereby they may be readily removed from engagement with dishes and other culinary articles within the washing machine casing so as to permit removal thereof from the casing at the completion of a washing operation.

While the lower ends of the holding rods 22 illustrated herein are shown as comprising surfaces which are transverse to the axis of the rods, it is to be understood that said lower ends may be shaped in any convenient manner so as to render the engagement thereof with dishes and other culinary articles more effective for purposes of holding the latter against being dislodged or displaced during a washing operation.

While the invention has been illustrated and described in its preferred embodiment and has included certain details, it should be understood that the invention is not to be limited to the precise details herein illustrated and described since the same may be carried out in other ways, falling within the scope of the invention as claimed.

I claim as my invention:

1. In a washing machine, a casing enclosing a washing compartment, a plurality of holding means supported by said casing and movable relative to each other and relative to said casing into engagement with dishes when placed within said washing compartment and operable to hold said dishes against displacement relatively to said casing during a washing operation, and locking means supported for movement relative to said holding means and operable to engage the latter and lock the same against movement relative to each other and to said casing.

2. In a washing machine, a casing enclosing a washing compartment, a plurality of holding means supported by the top of said casing and movable vertically relative to each other and to said top and into engagement with dishes when placed within said washing compartment, said holding means being operable to hold said dishes against displacement relative to said casing during a washing operation, and locking means supported by the top of said casing for movement relative to said holding means and operable to engage the latter and lock the same against movement relative to each other and to said casing.

3. In a washing machine, a casing enclosing a washing compartment, a plurality of elongated rods supported by the top of said casing and movable vertically relative to each other and through said top of said casing, the lower ends of said rods being movable into engagement with dishes when placed within said washing compartment and operable to hold said dishes against displacement relative to said casing during a washing operation, and locking means associated with said rods and movably operable to engage said rods and lock the same against movement relative to each other and to said casing.

4. In a washing machine, a casing enclosing a washing compartment, a plurality of enlongated rods supported by the top of said casing and movable vertically relative to each other and through said top of said casing, the lower ends of said rods being movable into engagement with dishes when placed within said washing compartment and operable to hold said dishes against displacement relative to said casing during a washing operation, and locking means supported by the top of said casing and including members simultaneously movable respectively into engagement with said elongated rods to lock the same against movement relative to each other and to said casing.

5. In a washing machine, a casing enclosing a washing compartment, a plurality of elongated rods supported by the top of said casing and movable vertically relative to and through said top of said casing, the lower ends of said rods being movable into engagement with dishes when placed within said washing compartment and operable to hold said dishes against displacement relative to said casing during a washing operation, locking members supported by the top of said casing, means carried by each of said locking members and operable to cause said locking members respectively frictionally to engage said elongated rods to permit individual adjustment thereof relative to said dishes, and locking means engageable with all of said locking members and operable to move said locking members into locking engagement with said rods to prevent movement thereof relative to said casing.

6. In a washing machine, a casing enclosing a washing compartment and including a top, a plurality of spaced bearings supported by said top, said bearings having their axes disposed vertically and substantially parallel to each other, an elongated rod slidably mounted at each bearing and comprising holding means movable relative to said top and into engagement with dishes when placed within said washing compartment, a plurality of bars movable relative to the top of said casing and engageable at one end with said rods, the other ends of said bars extending substantially radially from said rods toward a common center, and a cam rotatably mounted relative to said common center and simultaneously engageable with said other ends of said bars, said cam when rotated serving to move said bars into firm engagement with said rods to lock them against movement within their bearings.

7. In a washing machine, a casing enclosing a washing compartment and including a top, a plurality of spaced bearings supported by said top, said bearings having their axes disposed vertically and substantially parallel to each other, an elongated rod slidably mounted at each bearing and comprising holding means movable relative to said top and into engagement with dishes when placed within said washing compartment, guide means supported by said top, a plurality of bars movable longitudinally relative to said guide means, one end of each bar having a seat conforming to said rods and engageable therewith, the other ends of said bars extending substantially radially from said rods toward a common center, and a cam rotatably mounted relative to said common center and simultaneously engageable with said other end of said bars, said cam when rotated serving to move said seats in said bars into firm engagement with said rods to lock them against movement within their bearings.

8. In a washing machine, a casing enclosing a washing compartment and including a top, a plurality of spaced bearings supported by said top, said bearings having their axes disposed vertically and substantially parallel to each other, an elongated rod slidably mounted at each bearing and comprising holding means movable relative to said top and into engagement with dishes when placed within said washing compartment, guide means supported by said top, a plurality of bars movable longitudinally relative to said guide means, one end of each bar having a seat conforming to said rods and engageable therewith, a spring biased shoe on the other end of each of said bars and said other ends extending substantially radially from said rods toward a common center, and a star cam rotatably mounted relative to said common center and simultaneously engageable with said shoes on said bars, said cam when rotated serving to move said seats in said bars into firm engagement with said rods to lock them against movement within their bearings.

FRANK G. WALKER.

REFERENCES CITED

The following references are of record in the file of this patent:

UNITED STATES PATENTS

| Number | Name | Date |
| --- | --- | --- |
| 447,584 | Rowell | Mar. 3, 1891 |
| 465,393 | Von Skotnicki | Dec. 15, 1891 |
| 701,384 | Peck | June 3, 1902 |
| 1,133,088 | Brooks | Mar. 23, 1915 |
| 1,555,573 | Hempel | Sept. 29, 1925 |